Oct. 18, 1932.     G. A. DE VLIEG     1,883,611
TOOL HOLDER
Filed April 7, 1930
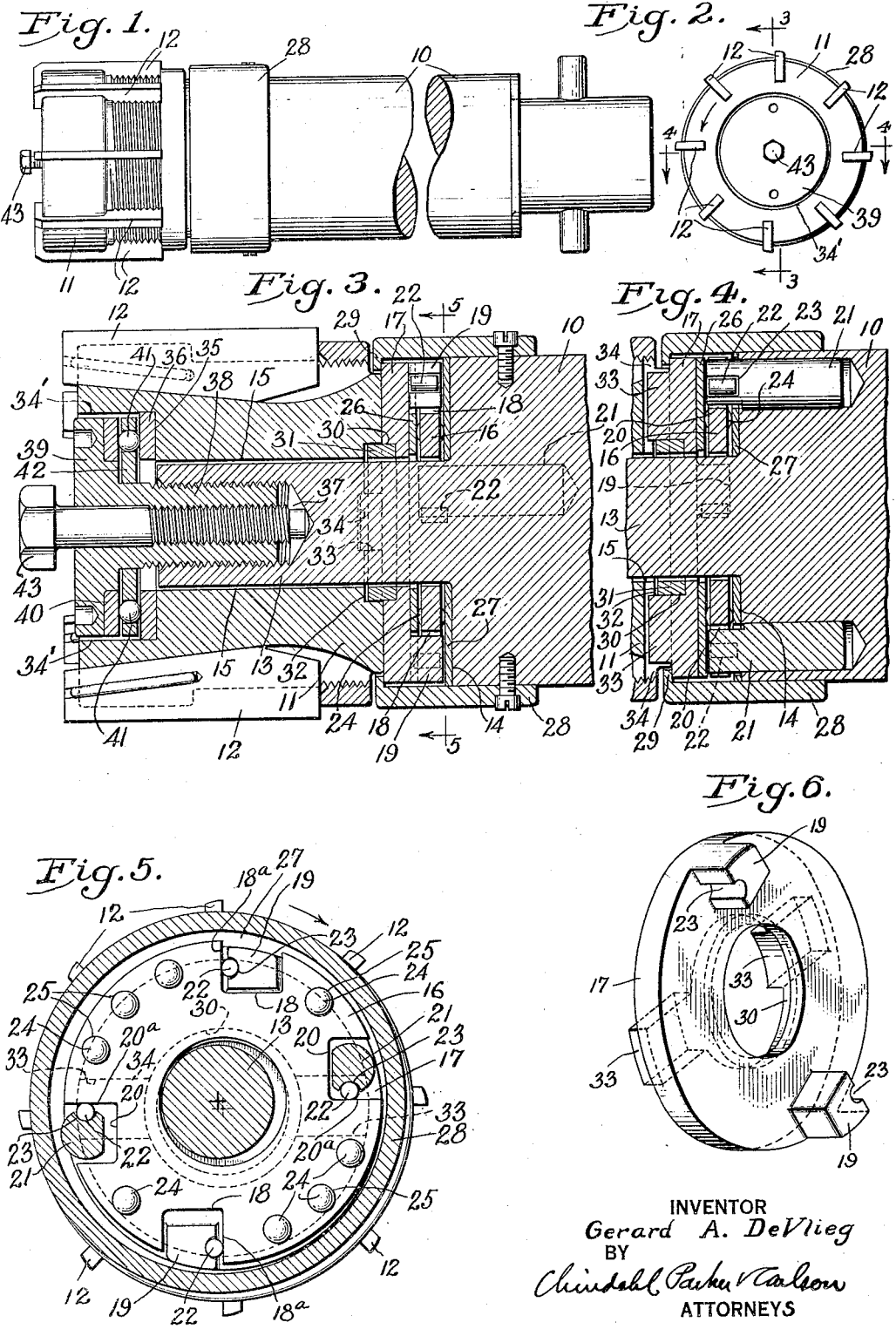
INVENTOR
Gerard A. DeVlieg
BY
Chindahl, Parker & Carlson
ATTORNEYS Patented Oct. 18, 1932

1,883,611

UNITED STATES PATENT OFFICE

GERARD A. DE VLIEG, OF ROCKFORD, ILLINOIS

TOOL HOLDER

Application filed April 7, 1930. Serial No. 442,085.

The present invention relates to improvements in holders for cutting tools, such as reamers and the like, and has particular reference to a new and improved floating tool coupling permitting self-centering and alinement.

Various objects of the invention reside in the provision of a novel floating tool coupling which serves to hold the tool securely on the tool support, which provides an outer end clamp for holding the tool in position against endwise movement on the support, which permits ready assembly and disassembly, which is closely associated with the tool and which is compact and sturdy in construction.

Another object resides in the provision of anti-friction bearings between the relative sliding parts of the coupling, and in the end clamp.

Further objects and advantages will become apparent as the description proceeds.

In the accompanying drawing, Figure 1 is a fragmentary side elevational view of a cutter mounted on a support by a coupling embodying the features of my invention.

Fig. 2 is an outer end view of the cutter and the coupling.

Fig. 3 is an axial sectional view on an enlarged scale taken along line 3—3 of Fig. 2.

Fig. 4 is a fragmentary axial sectional view on an enlarged scale taken along lines 4—4 of Fig. 2.

Fig. 5 is a transverse sectional view taken along line 5—5 of Fig. 3.

Fig. 6 is a perspective view of one of the parts of the coupling.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawing the invention in its preferred embodiment comprises a spindle 10 adapted to be connected to a suitable source of power (not shown). While various types of tools may be mounted on the spindle, in the present instance I have shown a rotary cutter comprising a body 11 and a plurality of peripherally spaced blades 12.

The spindle 10 is provided with a reduced axial extension 13, and presents an annular end bearing shoulder 14 at the base of the extension. The body 11 of the cutter is formed with an axial bore 15 which is adapted to receive the spindle extension 13 and which is somewhat larger in diameter than the latter to permit relative lateral movement.

A suitable universal drive coupling between the spindle 10 and the cutter body 11 is provided, and in the present instance is secured as a unitary means in end bearing engagement against the shoulder 14 for driving assembly with the body when the latter is mounted on the extension 13. This drive coupling comprises a pair of coacting members, preferably in the form of flat annular disks 16 and 17, which are disposed loosely about the extension 13 for relative lateral movement.

The inner disk 16 is formed with two diametrically opposed notches 18 in its periphery. These notches are substantially rectangular in outline, and are slightly offset from the radial in advance to position the rear drive faces 18$^a$ in radial alinement. The outer disk 17 is formed with two diametrically opposed projections or lugs 19 which extend rearwardly into the notches 18 for driving engagement therewith.

The disk 16 is formed with two other diametrically opposed notches 20 in its periphery which are offset from the radial rearwardly to position the front faces 20$^a$ in radial alinement, and which are so located that the faces 20$^a$ extend in a direction perpendicular to that of the notches 18$^a$. A pair of diametrically opposed driving abutments, preferably in the form of pins 21, are securely set in the outer end of the spindle 10, and project from the bearing shoulder 14 into the notches 20 for engagement with the faces 20$^a$.

Preferably, roller bearings 22 are disposed in recesses 23 in the rear faces of the lugs 19 for engagement with the rear faces 18ª of the notches 18, and also in the front faces of the pins 21 for engagement with the front faces 20ª of the notches 20. A plurality of ball bearings 24 are disposed in a series of peripherally spaced recesses or bores 25 opening through the disk 16, and project from opposite sides of the latter respectively into bearing engagement with a hardened bearing plate 26 between the disks 16 and 17, and a hardened bearing plate 27 set against the shoulder 14.

It will be evident that the disks 16 and 17 as a unit are freely movable in one direction laterally of the spindle 10, that the disk 17 is freely movable relative to the disk 16 in a direction perpendicular to the first mentioned direction laterally of the spindle, and hence is freely movable in any direction laterally of the spindle, and that a rotative drive will be imparted from the spindle through the pins 21, the disk 16, and the lugs 19, to the disk 17 with the latter in any lateral position of adjustment.

To hold the parts of the drive coupling in assembled relation against the bearing face 14, a sleeve 28 is secured to the forward end of the spindle 10, and is formed with a peripheral end flange 29 extending inwardly over the outer peripheral edge of the disk 17.

The forward face of the disk 17 is provided with suitable means for effecting a drive connection with the tool when the latter is secured on the extension 13, and in the present instance is formed in its front face with a circular concentric recess 30. A ring 31 is secured in the recess 30 and projects from the front face of the disk 17 for engagement in a concentric recess 32 in the rear end face of the tool body 11 to effect accurate axial alinement between the disk and the body. The disk 17 also is formed on its front face with a pair of diametrically opposed radial keys 33 which engage in diametrically opposed radial grooves 34 formed in the rear end face of the tool body 11. Thus, the universal drive coupling and the tool body are adapted to be assembled in driving relation merely by positioning the tool on the extension 13 and bringing the coacting surfaces thereof into engagement with the ring 31 and the keys 33.

An outer end clamp is provided for securing the tool against and in interfitting driving engagement with the disk 17. To this end, the outer end of the bore 15 is enlarged as indicated at 34' to define an annular shoulder 35. A hardened bearing plate 36 is positioned against the shoulder 35. Threaded axially into a bore 37 in the free outer end of the extension 13 is the shank 38 of a clamp having a circular clamp plate 39 concentric with and somewhat smaller in diameter than the bore 34'. A hardened annular bearing plate 40 is secured in the inner end face of the plate 39 in opposed relation to the plate 36. Disposed between the plates 36 and 40 are a plurality of ball bearings 41 which are suitably mounted in a bearing retainer 42 on the shank 38 of the clamp. A suitable lock bolt 43 is threaded axially through the shank 38 into engagement with the inner end of the bore 37 to retain the parts securely in position of adjustment.

To assemble the tool on the spindle 10, the body 11 is mounted on the extension 13 in driving engagement with the disk 17, and is clamped in this position by means of the clamp plate 39. Thus, all of the parts including the universal driving connection are held in end bearing engagement. By reason of the connection between the spindle 10 and the disk 16, and the disks 16 and 17, the tool is free to move laterally in any direction without affecting the rotative drive. The lateral self-alining movement is expedited by reason of the non-friction bearings 22, 24 and 41. The parts may be quickly and accurately assembled and disassembled, and are simple and sturdy in construction. The tool being self-alining and self-adjusting adapts itself to the particular requirements of the work, and in general is substantially noiseless in use and is accurate and efficient in operation.

I claim as my invention:

1. A tool holder comprising, in combination, a spindle having an axial extension and a transverse annular shoulder, a pair of diametrically opposed pins extending from said shoulder, an annular disk loosely disposed about said extension and having two diametrically opposed notches receiving said pins, the sides of said notches coacting with said pins being radial, a second annular disk loosely disposed about said extension and having two diametrically opposed abutments, said first mentioned disk having two diametrically opposed notches receiving said abutments, the sides of said last mentioned notches coacting with said abutments being radial and disposed at right angles to said first mentioned sides, means on said spindle for retaining said spindle and said disks in assembled relation, a tool, and means for securing said tool to said second disk.

2. A tool holder comprising, in combination, a spindle having a transverse shoulder on one end, a flat disk member slidably disposed against said shoulder and having a radial spline connection with said spindle permitting relative movement in one transverse direction, a flat disk member slidably disposed relative to said first mentioned disk member and having a radial spline connection therewith permitting relative movement in a transverse direction perpendicular to said first mentioned direction, a plurality of antifriction bearings mounted in said first mentioned disk member and projecting beyond each face thereof into bearing relation with said shoulder and said second mentioned member, a flange ring on said spindle and engaging said second mentioned member to hold said members in assembled relation against said shoulder, and a tool removably connected to said second mentioned member for movement therewith.

3. A tool holder comprising, in combination, a spindle having an axial extension and a transverse shoulder about the base of said extension, an annular member carrying a plurality of peripherally spaced ball bearings in engagement with said shoulder, said member being disposed loosely about said extension and having a radially slidable drive connection with said spindle, roller bearings between the relatively slidable parts of said connection, an annular member in engagement with said ball bearings opposite said shoulder, said last mentioned annular member being loosely disposed about said extension and having a radially slidable drive connection with said first mentioned member, said connections being perpendicular roller bearings between the relatively slidable parts of said last mentioned connection, means for securing said members and said spindle in assembled relation, a tool loosely disposed on said extension, and means for holding said tool against said last mentioned member, that tool and said last mentioned member having an interfitting clutch connection.

4. A tool holder comprising, in combination, a spindle having a reduced axial extension and a peripheral shoulder at the base of said extension, a drive coupling secured against said shoulder for universal movement laterally of said extension, said coupling having a rotative drive connection with said spindle and including a plurality of flat contiguous coupling members loosely disposed about said extension for limiting movement laterally thereof, said members being interconnected for rotative drive and for relative sliding movement in a plurality of directions laterally of said extension, one end member constituting a drive element, a tool loosely mounted on said extension, said element and said tool having interfitting parts to prevent relative lateral displacement, one part serving to effect axial alinement, the other part serving to prevent relative rotation, and means on the end of said extension for holding said parts in interfitting engagement.

5. A tool holder comprising, in combination, a spindle, means on said spindle defining a flat annular shoulder, a pair of diametrically opposed pins extending from said shoulder, a flat annular disk loosely disposed about said extension and having two diametrically opposed openings loosely receiving said pins, said openings and said pins coacting to transmit a rotative drive but permitting relative movement between said shoulder and said disk in one direction diametrically of said extension, a second flat annular disk loosely disposed about said extension and having two diametrically opposed abutments, said first mentioned disk having two diametrically opposed openings receiving said abutments and coacting therewith to transmit a rotative drive while permitting relative movement in another direction diametrically of said extension, a tool operatively connected to said second disk, and means for holding said spindle and said disks in assembled relation.

6. A tool holder comprising, in combination, a spindle having a flat annular transverse shoulder and an extension beyond said shoulder, means removably secured to the free end of said spindle defining a second relatively fixed flat annular transverse shoulder facing oppositely to said first mentioned shoulder, a plurality of flat annular members loosely mounted on said extension between said shoulders for limited lateral movement diametrically of said extension, one end member having a connection for rotative drive and for relative sliding movement in a direction diametrically of said extension with one of said shoulders, each two adjacent members constituting two parts having a connection for rotative drive and for relative sliding movement in a direction diametrically of said extension, said directions of sliding movement being different so as to provide a universal floating rotative drive, each connection comprising two diametrically opposed pins on one part and two diametrically opposed guideways receiving said pins on the other part and defining a straight diametrical line of movement and anti-friction bearings disposed between the coacting surfaces of said pins and said guideways, and a tool operatively connected with the other end member.

In testimony whereof, I have hereunto affixed my signature.

GERARD A. DE VLIEG.